Patented Mar. 21, 1950

2,501,199

UNITED STATES PATENT OFFICE 2,501,199

2-p-MENTHYL CARBINYL ACETATE

Richard B. Wearn and Carl Bordenca, Birmingham, Ala., assignors to Food Machinery and Chemical Corporation, a corporation of Delaware No Drawing. Application December 26, 1946,
Serial No. 718,606

1 Claim. (Cl. 260—489)

This invention relates to 2-p-menthyl carbinol, its esters, and processes for the production of these compounds.

It is an object of this invention to produce 2-p-menthyl carbinol and esters thereof by a simple and inexpensive process. A further object is to produce compounds which are particularly adapted for use as components of perfumes, flavoring extracts and the like. Additional objects will become apparent from a consideration of the following description and claim.

In accordance with the present invention 2-p-menthyl carbinol is produced by reducing 2-p-menthane aldehyde. The latter product is prepared from limonene, either dextro- or levo-rotatory, or dipentene by first hydrogenating the double bond on the side chain, and then reacting the resulting $\Delta^1$-p-menthene with carbon monoxide and hydrogen in the presence of a hydrogenation catalyst. This reaction is described in detail in the concurrently filed, copending application Serial No. 718,610, entitled "A menthane aldehyde and processes for its production." After reduction of 2-p-menthane aldehyde to 2-p-menthyl carbinol this compound may be used as such or may be converted to its ester by treatment with sodium acetate or similar fatty acid esterifying agents.

The invention may be more readily understood by a consideration of the following illustrative examples:

Example 1

A solution of 37 grams of aluminum isopropoxide in 200 cc. of anhydrous isopropyl alcohol was prepared. To this was added 30 grams of 2-p-menthane aldehyde (which may be prepared by reaction of limonene or $\Delta^1$-p-menthene with hydrogen and carbon monoxide in the presence of a suitable hydrogenation catalyst as shown in the patent application referred to above). The solution was refluxed for 3 hours, approximately two-thirds of the solvent was removed by distillation, and then the residue was poured into a mixture of ice and dilute hydrochloric acid. The oil which separated was washed with water, dried over anhydrous calcium sulfate, and distilled. There were obtained 28 grams (92 percent yield) of 2-p-menthyl carbinol; B. P. 80°/1–2 mm.; $n_D^{30}$ 1.4637; den.$_{20}$ 0.916.

Analysis: Calculated for $C_{11}H_{22}O$: C, 77.58%; H, 13.02%. Found: C, 77.09%; H, 12.70%.

Example 2

A hydrogenation bomb of 685 cc. capacity was charged with 30 grams of 2-p-menthane aldehyde and 3 grams of nickel-on-kieselguhr catalyst. Hydrogen was introduced to a pressure of 1600 p. s. i., and the bomb was shaken and heated at 130–150° C. for two hours. After cooling, the product was removed, filtered, and distilled. There were obtained 29 grams (96 percent yield) of 2-p-menthyl carbinol, B. P. 81°/1–2 mm., $n_D^{30}$ 1.4633.

Example 3

A mixture of 10 grams of 2-p-menthyl carbinol, 2.2 grams of anhydrous sodium acetate, 6.5 grams of acetic anhydride, and 12 cc. of anhydrous benzene was refluxed for 4 hours. It was then poured into water and the benzene layer washed successively with 5 percent sodium hydroxide, 2 percent hydrochloric acid, and water. Upon distillation, 11 grams (88 percent yield) of 2-p-menthyl carbinyl acetate were obtained.

Physical constants: B. P. 72–73°/1–3 mm., $n_D^{30}$ 1.4495.

It is to be understood that the above examples are illustrative merely of the present invention and are not to be considered as a limitation thereon. The individual reactants, the proportions thereof and the reaction conditions may be varied within relatively wide limits without departing from the scope of this invention.

For instance, it is contemplated that the 2-p-menthane aldehyde may be replaced by other alkyl-substituted alicyclic aldehydes. Furthermore, by selecting mixtures of these aldehydes it is possible to vary the odor and taste of the resulting alcohols and esters within relatively wide limits.

Reduction of the 2-p-menthane aldehyde may be accomplished by various well-known hydrogenation processes. For example, the aldehyde may be reduced with aluminum isopropoxide in isopropyl alcohol or it may be carried on using hydrogen and well-known hydrogenation catalysts such as nickel-on-kieselguhr, Raney nickel, and the like. In the case of catalytic hydrogenation of the aldehyde it is in general advisable to employ temperatures in the range of 75–150° C. and pressures in the range of 500 to 3000 pounds per square inch. The reaction is completed in from 1 to 4 hours depending upon the particular temperature and pressure employed.

2-p-menthyl carbinol has a sharp, sweet odor somewhat like that of geraniums. The acetate of this alcohol likewise has a pleasant, persistent odor, and the other fatty acid esters have similar persistent odors.

It is to be understood that in place of the acetate ester other esters may be produced by substituting a different fatty acid or alicyclic carboxylic acid for the acetic acid esterifying agent referred to in Example 3. Among the acids contemplated for this purpose are propionic acid, butyric acid, cyclopropane carboxylic acid, cyclohexane carboxylic acid, etc.

The products of this invention are characterized by pleasant, persistent odors and agreeable tastes. They are therefore particularly adapted for use in compounding perfumes, flavors, and related materials. They may also be used for intermediates for the production of other chemicals having a wide range of uses.

We claim:

2-p-menthyl carbinyl acetate.

RICHARD B. WEARN.
CARL BORDENCA.

REFERENCES CITED

The following references are of record in the file of this patent:

UNITED STATES PATENTS

| Number | Name | Date |
|---|---|---|
| 2,173,114 | Hawk et al. | Sept. 19, 1939 |

FOREIGN PATENTS

| Number | Country | Date |
|---|---|---|
| 127,855 | Germany | May 22, 1900 |
| 30,906 | Norway | July 26, 1920 |
| 361,888 | Great Britain | Nov. 19, 1931 |

OTHER REFERENCES

Newman et al., Chem. Zentr. II, p. 802 (1927).